(12) United States Patent
Sameske

(10) Patent No.: US 7,793,288 B2
(45) Date of Patent: Sep. 7, 2010

(54) AUTOMATIC RESOURCE MANAGEMENT OF A GUEST OPERATING SYSTEM USING INFORMATION IN DATA SET INDICATING MINIMUM SYSTEM REQUIREMENT

(75) Inventor: Volker Sameske, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 1308 days.

(21) Appl. No.: 11/296,755

(22) Filed: Dec. 7, 2005

(65) Prior Publication Data

US 2006/0136913 A1 Jun. 22, 2006

(30) Foreign Application Priority Data

Dec. 9, 2004 (EP) .................................. 04106446

(51) Int. Cl.
*G06F 9/455* (2006.01)
(52) U.S. Cl. .......................................... 718/1; 718/104
(58) Field of Classification Search ...................... 718/1, 718/104
See application file for complete search history.

(56) References Cited

U.S. PATENT DOCUMENTS

| | | | | |
|---|---|---|---|---|
| 7,136,800 B1 * | 11/2006 | Vega | ............................ | 703/23 |
| 7,577,722 B1 * | 8/2009 | Khandekar et al. | ........... | 709/220 |
| 7,577,959 B2 * | 8/2009 | Nguyen et al. | ............... | 718/105 |
| 2003/0061262 A1 * | 3/2003 | Hahn et al. | .................. | 709/104 |
| 2003/0097393 A1 * | 5/2003 | Kawamoto et al. | .............. | 709/1 |
| 2004/0010788 A1 * | 1/2004 | Cota-Robles et al. | ........... | 718/1 |
| 2007/0022421 A1 * | 1/2007 | Lescouet et al. | ................ | 718/1 |

\* cited by examiner

*Primary Examiner*—Meng-Ai An
*Assistant Examiner*—Brian Chew
(74) *Attorney, Agent, or Firm*—Cantor Colburn LLP; Steven Chiu

(57) ABSTRACT

A method for an automatic resource management of a virtual machine located as a layer between a physical hardware and at least one guest system, wherein the virtual machine provides an independent virtual hardware for each guest system running on the physical hardware. A data set is provided to the virtual machine by a guest system to be installed, comprising at least information about the minimum system requirements of the guest system. The virtual machine automatically decides, using the information comprised in the data set, if the minimum system requirements of said guest system can be provided by a virtual hardware generated by the virtual machine. At least the requested minimum system requirements of the guest system are provided by the virtual machine that fulfills at least the minimum system requirements of the guest system.

11 Claims, 3 Drawing Sheets

Figure 1:
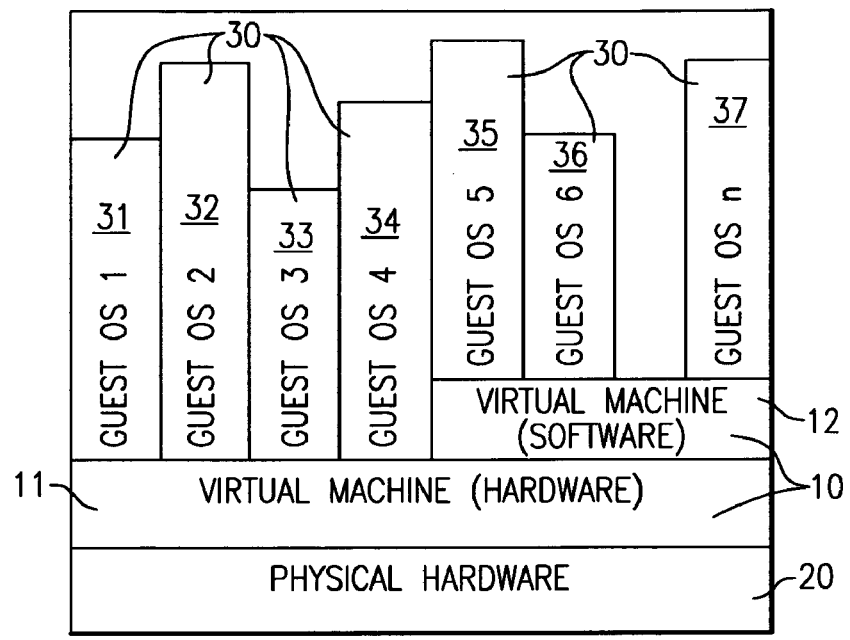

| GUEST | MAX CPUs | MAX MEM | --- | PRIORITY |
|---|---|---|---|---|
| GUEST OS 1 | 2 | 512 MB | --- | 1 |
| GUEST OS 2 | 4 | 256 MB | --- | 2 |
| --- | --- | --- | --- | --- |
| GUEST OS n | 1 | 128 MB | --- | 2 |

TABLE 1

| | CPU | MEMORY | DISK | NETWORK CARD | --- |
|---|---|---|---|---|---|
| MINIMAL | 1 | 256 MB | 1 | 1 | --- |
| OPTIMAL | 4 | 512 MB | 3 | 2 | --- |

TABLE 2

AUTOMATIC RESOURCE MANAGEMENT OF A GUEST OPERATING SYSTEM USING INFORMATION IN DATA SET INDICATING MINIMUM SYSTEM REQUIREMENT

TECHNICAL FIELD OF THE INVENTION

The present invention relates to a method, system and computer program product for an automatic resource management of a virtual machine located as a layer between a physical hardware and at least one guest system, wherein the virtual machine provides an independent virtual hardware for each guest system running on the physical hardware.

BACKGROUND OF THE INVENTION

A virtual machine is a layer between the physical hardware and one or more operating systems running on that hardware. The virtual machine virtualizes physically available system resources also called virtual hardware, e.g. CPU, memory storage devices, network devices and the like.

First of all the virtual machine provides functionality to run one or more operating systems on one physical hardware, on one machine. These operating systems are called guest operating systems or short guest systems and are independent from each other. These guest systems do not know about other guest systems (compare FIG. 1). To make this possible, the virtual machine has to virtualize all physical hardware resources required by the guest systems. These hardware resources can be CPU, memory, storage devices, network adapters or any other resource in the system. The virtual machine "multiples" these resources. As an example, the system has one physical CPU but each guest system gets its own virtual CPU. Or all guest systems use the same network adapter, but each guest system "thinks" it is the only user of that network adapter.

The virtual machine layer could be either hardware or software. The virtual machine has to distribute or share the available physical system resources. Here the resource management comes into play.

To install a guest operating system, the virtual machine has to provide an empty guest. The system administrator will create such an empty guest by using commands and tools provided with the virtual machine.

While doing this, the system administrator has to specify all system resources that will later be available for the guest operating system. This is an initial resource allocation, done by hand.

The administrator has to decide, which resources are required and sufficient to run the guest operating system in a high-performance way. Usually the hardware resources will not be changed anymore. But in case they have to be changed, then it is a manually change by the administrator and the operating systems have to be rebooted in most cases to make the latest changes known to the guest operating system.

Substantially two problems occur by this proceeding:

1. Each operating system has different hardware requirements, depending on the kind of operating system (Linux, z/OS, VSE, Windows . . . ) and depending on the task, the operating system has to do. For example the installation kernel of a Linux system, which performs the installation and is in fact a small Linux system too, requires 512 MB memory and one CPU, because installation is just data copying and does not need much CPU power, but much temporary memory. Once the Linux is installed properly and the installation kernel is replaced by the real Linux kernel, the Linux system only needs 256 MB memory, but 4 CPUs, because the Linux has CPU-intensive tasks to do.
2. Most days a year the system has all hardware resources it requires. But at some special days (month end, year end) the workload increases dramatically and much more CPU, memory or network bandwidth is required during these workload peaks.

To manage the different hardware requirements of different operating systems, usually the administrator reads the specific hardware requirements of a special operating system in the corresponding documentation or uses experience values or just uses the try-and error method and tries to run the operating system with minimum hardware requirements and in case this does not work or end in some error messages from the operating system, he increases some resources, e.g. CPU, memory and the like and tries again. Actually the administrator has to find out the hardware resources somehow, e.g. by experience, iterative approach or luck and has to provide them to the operating system using the commands and tools of the virtual machine. In case something changes, as described in the Linux installation example above, the administrator has to change the hardware resources manually.

To manage workload peaks, actually several approaches exist.

a. One approach is to provide all the times all hardware resources to the operating system that may be required at some peak points. In this case the operating system has more than enough resources, even if they are not needed most time of the year. The drawback of this solution is, that the virtual machine has to provide a virtual hardware to the guest system that requires more physical hardware resources than needed most of the time. These physical hardware resources cannot be used for other guest systems. Due to this it is an expensive approach, because less guest systems than possible can run on the virtual machine.

b. A second approach is to provide minimum hardware resources and in case of heavy workload peaks to increase some system resources manually by the administrator. The drawback of this approach is that the administrator has to notice the workload peak and has to be present to change the system resources manually.

c. A third approach is to install or to activate a prepared second operation system during the workload peaks by the administrator. The drawbacks of this approach is, that some resources for the second operating system have to be reserved on the virtual machine and the administrator has to be present to install or activate the second operating system at the time it is needed.

d. There also exists a fourth approach, which adds dynamically other systems that will be activated automatically during workload peaks. This does not require administrator interventions, but the systems to be activated have to be installed and administrated somehow. These are different operating systems and the admin has to make sure the workload takeover is transparent from outside. The drawback of this solution is that it needs some complex management since it makes no sense e.g. to use a different URL to distribute workload from a full web server. And also here, in case the additional backup servers are not within a virtual machine but real servers in a server farm, most of the backup servers that will be activated in workload peaks are idle most of the time.

The drawbacks of the prior art are, that manually intervention of an administrator is needed when installing a guest operating system on a virtual machine. During increased workload, the known approaches either need manually intervention of an administrator or extra resources that will only be used a few times during a year. In case of a manually intervention the problem occurs, that the administrator has to be present at the time his intervention is required and he has to notice the workload peak. If more resources than mostly needed are provided, the problem occurs, that these resources are unused most of the time and cannot be used by other applications or other guest systems. The known approach to activate other guest systems dynamically when required results in a high system management overhead because the additional activated systems have to be transparent. In case there are also some physical servers that could be activated to handle workload peaks they also will be unused resources most of the time. Another point is to keep these backup servers up-to-date regarding to security fixes.

OBJECT OF THE PRESENT INVENTION

The purpose of the invention is to develop a method for an automatic resource management of a virtual machine that makes manually interventions of an administrator at least during installation of a guest system obsolete, wherein the method shall be developable to be used to effectively and automatically manage the system resources provided to the guest systems by the virtual machine at least during increased workload of some guest systems plus a computer program product that allows to execute the method on a computer, plus a computer that can be used to execute the method.

BRIEF SUMMARY OF THE PRESENT INVENTION

The invention's technical purpose is met by the proposed method for an automatic resource management of a virtual machine located as a layer between a physical hardware and at least one guest system, wherein the virtual machine provides an independent virtual hardware for each guest system running on the physical hardware, that is characterized the following steps:
  providing a data set to the virtual machine by a guest system to be installed, comprising at least an information about the minimum system requirements of said guest system, e.g. when installing the guest system,
  automatically deciding by the virtual machine using the information comprised in said data set, if the minimum system requirements of said guest system can be provided by a virtual hardware generated by said virtual machine running on said specific physical hardware, wherein the decision depends preferably on the actual and/or the estimated load of the physical hardware and its configuration,
  if at least the requested minimum system requirements of said guest system can be provided by the virtual machine, generating of a virtual hardware by said virtual machine that fulfills at least the minimum system requirements of said guest system and
  providing said virtual hardware to said guest system by said virtual machine. If the resources of the physical hardware do not afford providing the minimal system requirements to the guest system, the installation is preferably aborted wherein e.g. an error message might be sent to the administrator of the virtual machine.
  If the physical hardware has still some resources left, the virtual machine can add some additional virtual hardware, e.g. a further CPU, more memory, additional storage devices or additional network devices to the guest system, e.g. up to the optimum system requirements optionally also comprised in the data set. The exchange of the data set and the information comprised in said data set between the virtual machine and the guest system will take place via an interface. The interface could be e.g. a storage access.

The proposed method for automatic resource management has the advantage over the state of the art that not the administrator but the guest operating system itself tells the virtual machine at system start the required hardware resources. This is an advantage since not every administrator knows the minimum or optimum system requirements of a special guest system, whereas the guest system itself does. Another advantage is, that different system requirements on the one hand during installation of the guest system and on the other hand of the installed guest system can also be handled automatically without administrator intervention.

In a preferred embodiment of the invention, said data set also comprises an information about the optimum system requirements of said guest system, wherein the virtual machine is provided with an information about the workload of the guest system by the guest system itself, so that the virtual machine is able to identify e.g. peak loads of the guest system and will workload-dependent provide a virtual hardware to the guest system up to its optimum system requirements by generating additional virtual hardware according to the information about the optimum system requirements and adding said additional virtual hardware to the virtual hardware already provided to the guest system.

Preferably the virtual machine will first verify the ability of generating additional virtual hardware dependant on the total virtual hardware provided to all guest systems and the power reserves of the physical hardware. The guest system tells the virtual machine its minimal and optimal system requirements and the virtual machine decides if the guest operating system gets more than minimal, e.g. using priorities.

Thereby it is possible to adapt the virtual hardware provided to the guest system on demand not only on system startup, but also dynamically to a later point in time for a specific timeframe, e.g. to neutralize workload peaks. The guest system tells the virtual machine changed hardware requirements autonomously. Additional resources could be charged on a time basis. Also here no administrator intervention or other pre-installed backup systems are required.

So a method is provided for autonomously adding, removing or changing the system resources provided by the virtual machine on demand of the guest operating system. Initially the guest operating system gives its hardware requirements during boot time to the virtual machine. These hardware resources should handle the most probable workload situations. For workload peaks the guest operating system could request additional hardware resources temporarily e.g. on a timeframe basis by using a defined interface. E.g. an initial definition or an access control table (ACT), specifies which guest operating system is allowed to request which kind of resources and in which amount.

There is no more need for additional guest operating systems or additional physical servers, which could be activated in heavy workload situations. All this can be handled within one guest operating system by increasing single hardware resources on demand. This way there is no administration overhead for extra guest operating systems or servers since less operating systems are required with less administration effort regarding e.g. user management, IP addresses, security fixes, etc.

In a preferred embodiment of the invention, the virtual machine provides an interface for the guest system to send load-dependent hardware requests to the virtual machine. The interface can be e.g. a function call provided by the hypervisor of the virtual machine.

In a preferred embodiment of the invention, the guest systems running on the virtual machine feature individual degrees of priority e.g. defined by the administrator when installing the guest system and/or during the operation of the guest system that are provided to the virtual machine wherein the generation of additional virtual hardware by the virtual machine to a specific guest system is dependant on workload and priority degree of said guest system. This way it is possible to reallocate resources from less privileged systems, e.g. batch workload to more privileged systems, e.g. online transaction workload. This could be done in case there are no free resources of the physical hardware left to distribute.

In another preferred embodiment of the invention, the data set is located at a defined position in the code of the guest system.

In another preferred embodiment of the invention, said data set is located in the image of the guest system.

In another preferred embodiment of the invention, the data set is located anywhere in the code of the guest system and a pointer referring to said data set is located at a defined position in said code.

In an additional preferred embodiment of the invention, the data set is located anywhere in the code of the guest system and the pointer referring to said data set is located in the image of the guest system.

In an additional preferred embodiment of the invention, the data set is not provided by the guest system but by the administrator before installing the guest system.

In an additional preferred embodiment of the invention, the data set is not provided by the guest system but by a requirement table included in the code of the virtual machine.

In a particularly preferred embodiment of the invention, said method is performed by a computer program product stored on a computer usable medium comprising computer readable program means for causing a computer to perform the method mentioned above, when said computer program product is executed on a computer.

The last part of the technical purpose of the invention is met by a computer comprising means to provide a virtual machine providing a virtual hardware to at least one guest system, which computer is characterized in, that the computer comprises means to get information about at least the minimum system requirements of said guest system, means that enable the virtual machine to automatically decide, if the minimum system requirements of said guest system can be provided by a virtual hardware provided by said virtual machine, and means to provide said virtual hardware by said virtual machine to said guest system.

A preferred embodiment of said computer comprises means to get information about the optimum system requirements of the guest system, means to get information about the workload of said guest system, means to automatically decide according to the workload, if the guest system gets additional virtual hardware up to the optimum system requirements or not and means to be suited to provide additional virtual hardware to the guest system.

The means to get information about the minimum system requirements can be the same like the means to get information about the maximum system requirements. The means to get information about the workload of said guest system can be an interface. Also, the means to provide the virtual hardware to the guest system can be the same like the means to provide additional virtual hardware to the guest system.

Another preferred embodiment of said computer comprises means to get information about a degree of priority of said guest system and means to automatically decide according to the degree of priority and according to the workload, if the guest system gets additional virtual hardware up to the optimum system requirements or not.

Preferably the computer comprises a physical hardware comprising at least a CPU and a main storage, wherein the means mentioned above are provided by said physical hardware and wherein the virtual machine is performed as software running on said physical hardware and located as a layer between the physical hardware and at least one guest system running on an individual virtual hardware provided by said virtual machine.

The foregoing, together with other objects, features, and advantages of this invention can be better appreciated with reference to the following specification, claims and drawings.

BRIEF DESCRIPTION OF THE DRAWINGS AND THE TABLES, WITH

Figure 2:
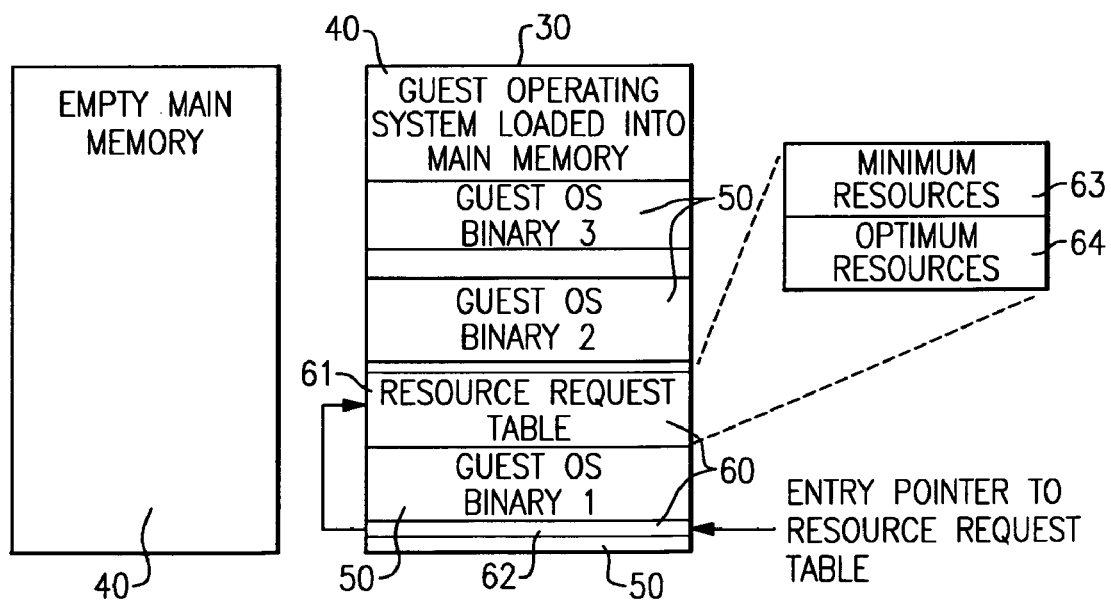
Figure 3:
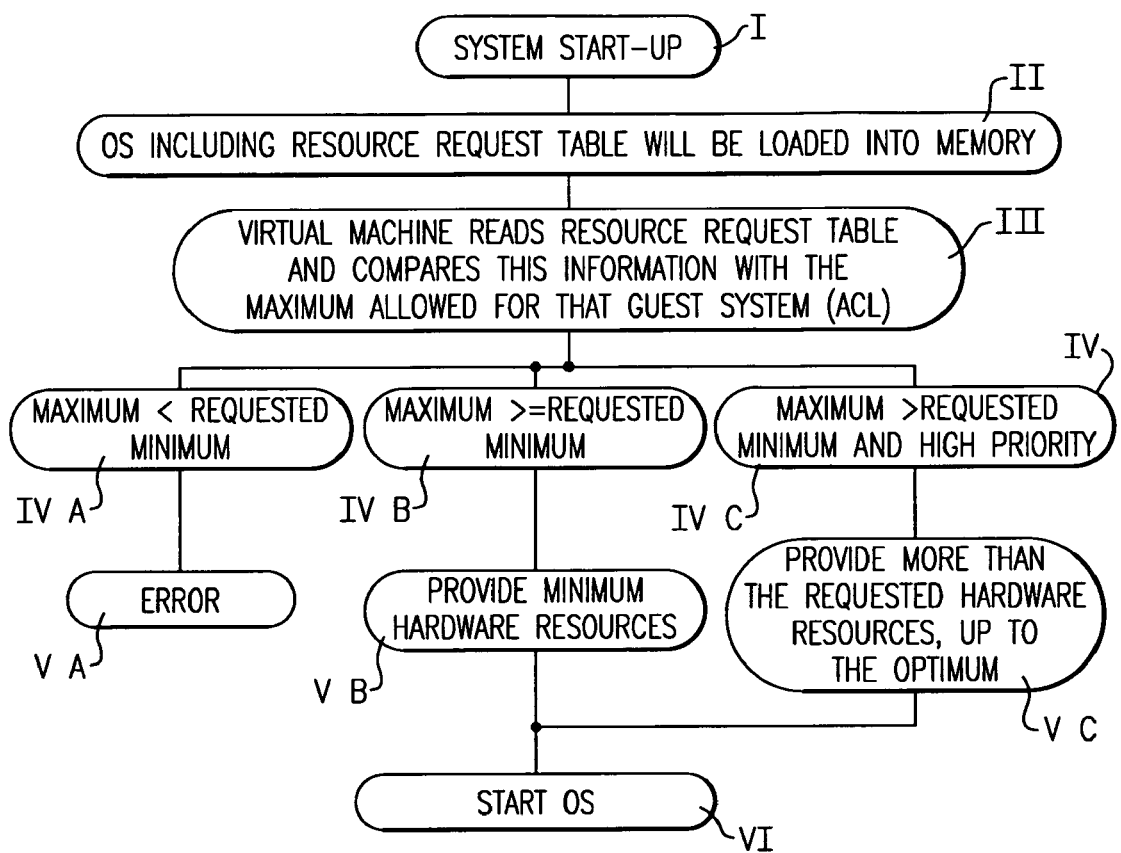
Figure 4:
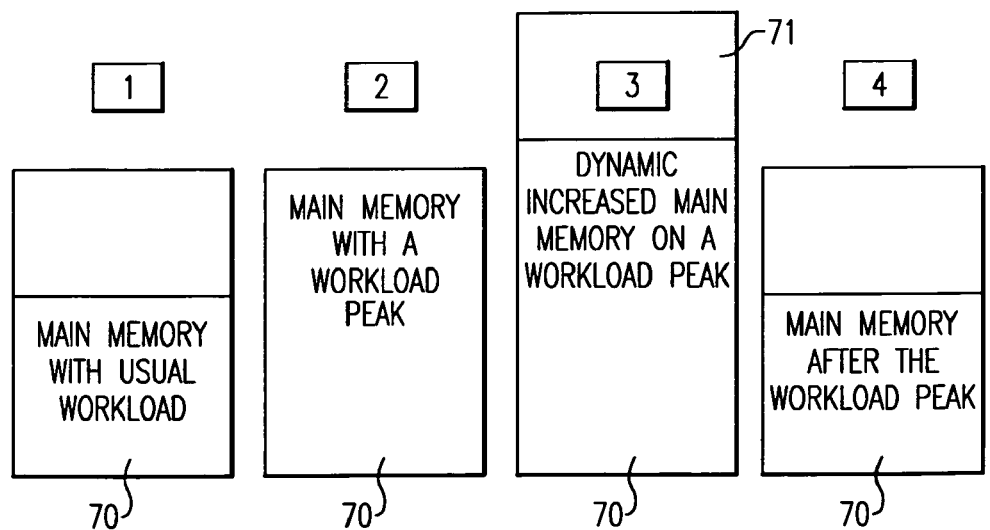

FIG. 1 showing a scheme of a virtual machine running on a physical hardware with several guest systems running on the virtual machine, FIG. 2 showing a scheme of a dynamic resource management according to the invention during system start-up, FIG. 3 showing a flowchart of the method according to the invention during system start of a guest system, FIG. 4 showing a scheme of the dynamic resource management after system boot according to the invention, Table 1 showing an access control table stored within the virtual machine with the upper, optimum system requirements the guest systems are allowed to request, and Table 2 showing the minimum and the optimum system requirements of a guest system comprised in a data set.

Paths for Performing the Invention:

FIG. 1 visualizes a server with a virtual machine 10 located as a layer between a physical hardware 20 and several guest operating systems 30. A first virtual machine 11 is achieved as a hardware virtual machine on the physical hardware 20. Within this first virtual machine 11 run four guest operating systems 31, 32, 33 and 34 independently from each other and a second virtual machine 12. The second virtual machine 12 is achieved as a software virtual machine. This second virtual machine 12 hosts operating systems five up to n (reference numerals 35, 36, 37).

FIG. 2 shows the system start-up of a guest operating system 30 in a virtual machine 10 like shown in FIG. 1. First the main memory 40 is completely empty (FIG. 2 left). On system start-up all binary code fragments 50 belonging to the guest operating system 30 will be loaded into main memory 40 (FIG. 2 middle). A data set 60 comprising a resource request table 61 with the minimum 63 and optimum system resources 64 (FIG. 2 right) as shown in Table 2 and a pointer 62 to find the resource request table 61 are part to these binaries 50.

The flowchart in FIG. 3 shows what happens during system start of a guest operating system 30 on a virtual machine 10 like shown in FIG. 1. When the guest operating system 30 starts up (level I in FIG. 3), a data set 60 including a resource request table 61 as shown in Table 2 and FIG. 2 is provided to the virtual machine 10 by the guest system 30 to be installed, comprising an information about the minimum system requirements 63, the optimum system requirements 64 and a priority degree of this guest system 30 (level II in FIG. 3). The virtual machine 10 reads the resource request table 61 and compares this request with the system resources maximally allowed for this guest operating system 30 (level III in FIG. 3). What is maximally allowed can depend on the resources of the physical hardware 20, on the workload of the physical hardware 20 or on a default value stored in the virtual machine 10. The virtual machine 10 will then automatically decide if the minimum system requirements 63 of said guest system 30 can be provided by a virtual hardware generated by the virtual machine 10 (level IV in FIG. 3). For this decision the virtual machine 10 uses the information stored in the resources request table 61 comprised in the data set 60. If at least the requested minimum system requirements 63 of the specific guest operating system 30 can be provided (level IV B), the virtual machine 10 generates a virtual hardware that fulfills at least the minimum system requirements 63 of the guest operating system 30. This virtual hardware is then provided to the guest operating system 30 by the virtual machine 10 (level V B in FIG. 3). After this, the guest operating system 30 starts (level VI in FIG. 3). If the virtual machine 10 reaches the decision in level IV A that the minimum system requirements 63 cannot be provided to the guest system 30, an error occurs in level V A and the installation of the guest system 30 is aborted. If the virtual machine 10 reaches the decision in level IV C that more than the minimum system requirements 63 can be provided to the guest system 30, a virtual hardware up to the optimum system requirements 64 can be provided to the guest system 30 in level V C, wherein after level V C the guest operating system 30 starts (level VI in FIG. 3).

Thereby the guest operating system requests autonomously the required hardware resources, which are restricted from the virtual machine. The guest operating system gets the requested resources in a range from the minimum requested up to the optimum requested resource request, depending on the priority of that guest operating system also comprised in the data set and depending on the availability of additional resources.

FIG. 4 shows the dynamic resource management after system boot. Box 1 (left) shows the main memory 70 of a guest operating system with usual workload. With box 2 (middle left) the workload increases and much more memory is required. The guest operating system notices this and request additional memory 71 from the virtual machine (box 3, middle right). After the workload peak, when the workload is back to normal, the additional memory 71 is no longer required (box 4, right). To make autonomous hardware resource management possible, a kind of access control is required to restrict access to virtual hardware resources.

For that purpose an access control table (ACT) as shown in Table 1 will be established within the virtual machine. This ACT could be stored within the hypervisor, which is the kernel of the virtual machine. The ACT is a table, containing the maximal usable set of system resources 80 of each guest operating system. This table contains the upper limit of virtual hardware resources 81, 82, 83 a guest operating system is allowed to request. Additionally there is stored a priority 90 for each guest operating system.

The information stored in the ACT are provided by a data set provided with each guest operating system. The data set comprises the minimum and optimum system resources of the specific guest system and also a priority degree for this guest operating system as shown in Table 2. For example, a Linux guest system "Linux03" is allowed to request 1 CPU, 256 MB storage, one disk, one network adapter, etc. But in case there are additional resources available and the priority of the guest operating system is high enough, it is allowed to use up to 4 CPUs, 512 MB of memory, 3 disks and 2 network cards.

Now it will be distinguished between the two problems discussed in the preface.

1. Dynamic resource management during guest system start-up. The guest operating system tells the virtual machine during system startup its hardware requirements. The guest operating system provides a data set with two different information about system resources requests to the virtual machine. The first information contains the minimum hardware resources, which are required to run the guest operating system. The guest operating system will not be able to run with less than these resources. The second information contains the optimum system resources, a nice-to-have. Provided with these resources the guest operating system runs optimal.

The virtual machine has to assure the minimum system requirements and can provide additional resources up to the optimal system requirements in case there are unused resources available.

One approach to hand over these information contained in table 2 is the following. The guest operating system contains one ore more binaries (binary code segments). During system start-up these binaries will be loaded into main memory and executed. Now this resource requirement table comprised in the data set could be stored in an empty area within the code binaries or somewhere between the binaries. To locate the resource requirement table, which could be stored on different locations in main memory, depending on the guest operating system, a well-defined pointer is used. This pointer is placed on a fixed, well-defined location within the first few bytes in main memory (low core). This pointer is always at this location and points to the actual resource request table.

The virtual machine loads the guest operating system including the resource request table during system start into main memory. After that it follows the pointer to find the resource request table. Then the minimal system resources will be given to the guest operating system. If the virtual machine gives some more resources, up to the optimal system resources depends on the priority of that guest system, stored in the ACT (table 1) from above. After that the guest operating system will be booted (FIG. 2).

The resource request table and the pointer to this table are part of the guest operating system code and will be delivered with the operating system. It is not much effort to add this information to existing operating systems. There are only two additional information, the resource request table and the pointer. The guest operating system itself has not to be changed to do that, it is just some additional piece of binary code.

In case there is no virtual machine, nobody will evaluate this additional information. Hence it is completely transparent. In case there is a virtual machine, supporting the dynamic resource management feature as described, it will use the information provided within the resource request table and otherwise not.

2. The second problem discussed in the preface is not related to the system startup from a guest operating system, but rather to a dynamic resource management of a running guest operating system. It could be used to handle time-restricted workload peaks.

Initially the guest operating system provides the virtual machine with its hardware requirements during boot time. The virtual machine provides the minimum system requirements to the guest operating system. These virtual hardware resources should handle the most probable workload situations. For workload peaks the guest operating system must request additional hardware resources temporarily e.g. on a timeframe basis.

Thereby the guest operating system recognizes increased workload and requests additional hardware resources to handle this increased workload. What kind of hardware resource depends on the guest operating system. This could be an additional CPU, more memory or e.g. for a web-server an additional network card (FIG. 4).

The guest operating system requests the additional resources, using an interface or commands, provided by the virtual machine.

Contrary to the proceeding discussed under 1, where the hardware resources were generated before the guest system comes up, here the system has to handle changed hardware resources on the fly. This means the guest operating system has to detect e.g. a new CPU, additional memory, additional adapter cards or disks. This requires the guest operating system to be changed.

The request calls and the dynamic resource handling have to be added.

By doing this, workload peaks could be handled from the same operating system. There is no need to have other installed guest systems available and to split the workload. Only the system resources of the existing guest operating system have to be increased autonomously. This saves operational overhead to maintain other spare guest systems (software, hardware, security fixes, etc.).

It is also possible to re-use already distributed hardware resources from guest systems with lower priority for guests with higher priority, in case the low-priority guest operating system runs above minimum hardware requirements. This way the whole virtual machine could manage hardware resources dynamically between all guest operating systems.

Thereby additional resources could be charged on a time basis. Also here no administrator intervention or other pre-installed backup systems are required.

After the workload peak the additional system resources can be removed. This can be done after a defined timeframe or by using the same way that is used to increase the system resources.

Additional used resources could be invoiced and paid only for the time being used. This gives customers the benefit to be flexible in workload peaks, but only pay for hardware, when it is really required.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

The invention claimed is:

1. Method for an automatic resource management of a virtual machine located as a layer between a physical hardware and at least one guest operating system, the method comprising:

initializing a guest operating system on the physical hardware;

receiving at the virtual machine a data set from said guest operating system, the data set comprising information about minimum system requirements of said guest operating system;

automatically deciding by the virtual machine using the information in said data set, if the minimum system requirements of said guest operating system can be provided by a virtual hardware generated by said virtual machine;

generating the virtual hardware that fulfills at least the minimum system requirements of said guest operating system, the generating in response to the initializing and to determining that at least the minimum system requirements of said guest operating system can be provided by the virtual hardware;

providing said virtual hardware to said guest operating system by said virtual machine; and starting said guest operating system on said virtual hardware.

2. Method according to claim 1, wherein said data set further comprises information about optimum system requirements of said guest operating system, wherein the virtual machine is provided with information about a workload of the guest operating system by the guest operating system itself and provides the virtual hardware to the guest operating system up to its optimum system requirements by generating additional virtual hardware according to the information about the optimum system requirements and adding said additional virtual hardware to the virtual hardware already provided to the guest operating system.

3. Method according to claim 2, wherein the virtual machine provides an interface for receiving information about the workload of the guest operating system.

4. Method according to claim 2, wherein the guest operating system features individual degrees of priority that are provided to the virtual machine wherein the generation of additional virtual hardware by the virtual machine to a specific guest operating system is dependant on load and priority degree of said guest operating system.

5. Method according to claim 1, wherein said data set is located in an image of the guest operating system.

6. Method according to claim 1, wherein the data set is located in a code of the guest operating system and a pointer referring to said data set is located at a defined location in said code.

7. Method according to claim 1, wherein the data set is located in a code of the guest operating system and a pointer referring to said data set is located in an image of the guest operating system.

8. Computer system comprising:

means for initializing a guest operating system on the physical hardware;

means for receiving at the virtual machine a data set from said guest operating system, the data set comprising information about minimum system requirements of said guest operating system;

means for automatically deciding by the virtual machine using the information in said data set, if the minimum system requirements of said guest operating system can be provided by a virtual hardware generated by said virtual machine;

means for generating the virtual hardware that fulfills at least the minimum system requirements of said guest operating system, the generating in response to the initializing and to determining that at least the minimum system requirements of said guest operating system can be provided by the virtual hardware;

means for providing said virtual hardware to said guest operating system by said virtual machine; and means for starting said guest operating system on said virtual hardware.

9. Computer system according to claim 8, further comprising:

means for getting information about optimum system requirements of the guest operating system;

means for getting information about a workload of said guest operating system;

means for automatically deciding according to the workload, that the guest operating system gets additional virtual hardware up to the optimum system requirements; and means for providing additional virtual hardware to the guest operating system.

10. Computer system according to claim 9, further comprising:

means for getting information about a degree of priority of said guest operating system; and means for automatically deciding according to the degree of priority and according to the workload, if the guest operating system gets additional virtual hardware up to the optimum system requirements.

11. A computer program product stored on a non-transitory computer usable medium comprising computer readable program means for causing a computer to perform a method comprising:

initializing a guest operating system on physical hardware;

receiving a data set from said guest operating system, the data set comprising information about minimum system requirements of said guest operating system;

automatically deciding using said information in said data set, if said minimum system requirements of said guest operating system can be provided by a virtual hardware generated by a virtual machine;

generating said virtual hardware that fulfills at least said minimum system requirements of said guest operating system, the generating in response to the initializing and to determining that at least the minimum system requirements of said guest operating system can be provided by said virtual hardware;

providing said virtual hardware to said guest operating system; and starting said guest operating system on said virtual hardware.

* * * * *